United States Patent [19]

Cannon et al.

[11] Patent Number: 4,677,999
[45] Date of Patent: Jul. 7, 1987

[54] CANOPY

[75] Inventors: Stuart R. Cannon, St. Andrews; William J. Brazenor, North Melbourne; Peter W. Kneen, Arncliffe; John L. Mullen, Kew, all of Australia

[73] Assignee: S. & M. Cannon Pty. Ltd., Melbourne, Australia

[21] Appl. No.: 517,518

[22] PCT Filed: Nov. 12, 1982

[86] PCT No.: PCT/AU82/00186

§ 371 Date: Jul. 13, 1982

§ 102(e) Date: Jul. 13, 1982
(Under 37 CFR 1.47)

[51] Int. Cl.$^4$ .................. E04H 15/58; E04H 15/64; E04B 1/12; A47H 23/00
[52] U.S. Cl. .................. 135/117; 135/119; 135/DIG. 5; 52/63; 52/222; 160/328
[58] Field of Search .............. 135/115, 117, 119, 905, 135/DIG. 8, 97, 99, DIG. 9, DIG.5; 47/20, 28, 47; 52/63, 222; 160/327, 328, 329

[56] References Cited

U.S. PATENT DOCUMENTS

| | | | |
|---|---|---|---|
| 595,149 | 12/1897 | Coulson | 47/20 |
| 1,622,435 | 2/1924 | Frazee . | |
| 2,051,643 | 8/1936 | Morrison | 135/119 X |
| 2,355,008 | 8/1944 | Moran | 135/DIG. 8 |
| 2,403,661 | 7/1946 | Hurley | 160/328 |
| 2,497,596 | 2/1950 | Frieder et al. | 135/115 X |
| 2,604,897 | 7/1952 | Cottor et al. | 135/115 X |
| 2,979,129 | 3/1958 | Ketchum . | |
| 3,465,764 | 7/1967 | Huddle . | |
| 3,820,840 | 6/1974 | Forsberg . | |
| 3,874,396 | 4/1975 | Kirkham . | |
| 3,960,161 | 6/1976 | Norman | 135/905 X |
| 4,068,404 | 1/1978 | Sheldon | 47/28 R X |
| 4,162,100 | 7/1979 | Muscillo . | |
| 4,210,191 | 7/1980 | Li | 160/354 |
| 4,229,914 | 10/1980 | Lucas . | |
| 4,574,538 | 3/1986 | Grant | 52/222 X |

FOREIGN PATENT DOCUMENTS

| | | | |
|---|---|---|---|
| 3297 | of 1926 | Australia . | |
| 1234363 | 2/1967 | Fed. Rep. of Germany | 135/119 |
| 2339320 | 8/1973 | Fed. Rep. of Germany | 135/97 |
| 2430531 | 7/1978 | France . | |
| 387919 | 5/1965 | Switzerland . | |
| 277443 | 9/1927 | United Kingdom . | |
| 637114 | 5/1947 | United Kingdom . | |
| 727178 | 12/1953 | United Kingdom . | |
| 918136 | 2/1963 | United Kingdom | 135/99 |
| 729324 | 4/1980 | U.S.S.R. | 52/222 |

OTHER PUBLICATIONS

"The Country Life Book of Nautical Terms under Sail", Published 1978, by the Hamlyn Publishing Group Ltd., London.

Primary Examiner—Robert A. Hafer
Assistant Examiner—D. Neal Muir
Attorney, Agent, or Firm—Robert J. Koch

[57] ABSTRACT

This canopy system is supported by alternate poles and features edge cords to stress the center of the canopy fabric to reduce sag. The cords are attached adjacent each edge of each canopy segment and resembles a bell curve with respect to that edge. Longitudinal stresses placed on each cord urge the cord to straighten. As the cords straighten, they tension the center of the fabric without undue strain on the edge fabric. The result is a large area canopy with few interior poles and few peak elevations to the affected by wind forces.

13 Claims, 5 Drawing Figures

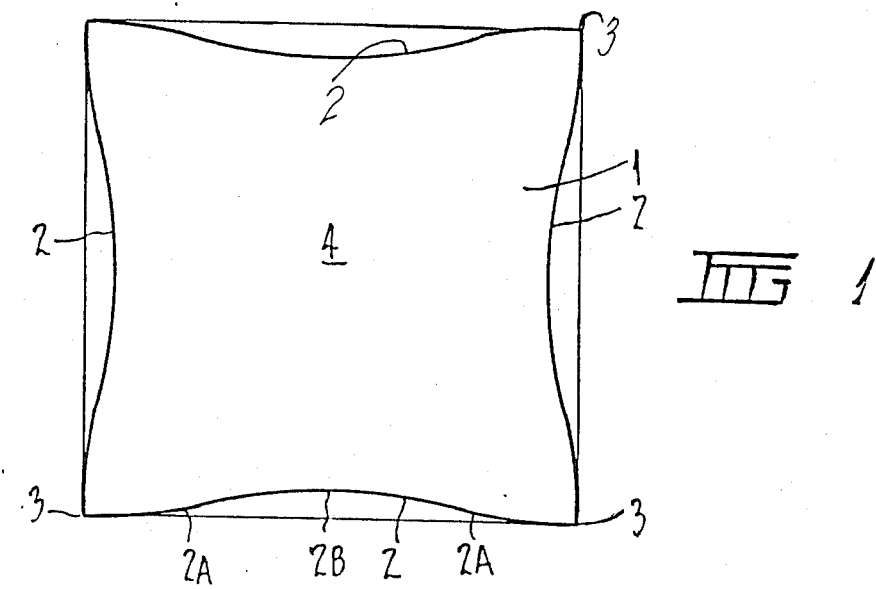
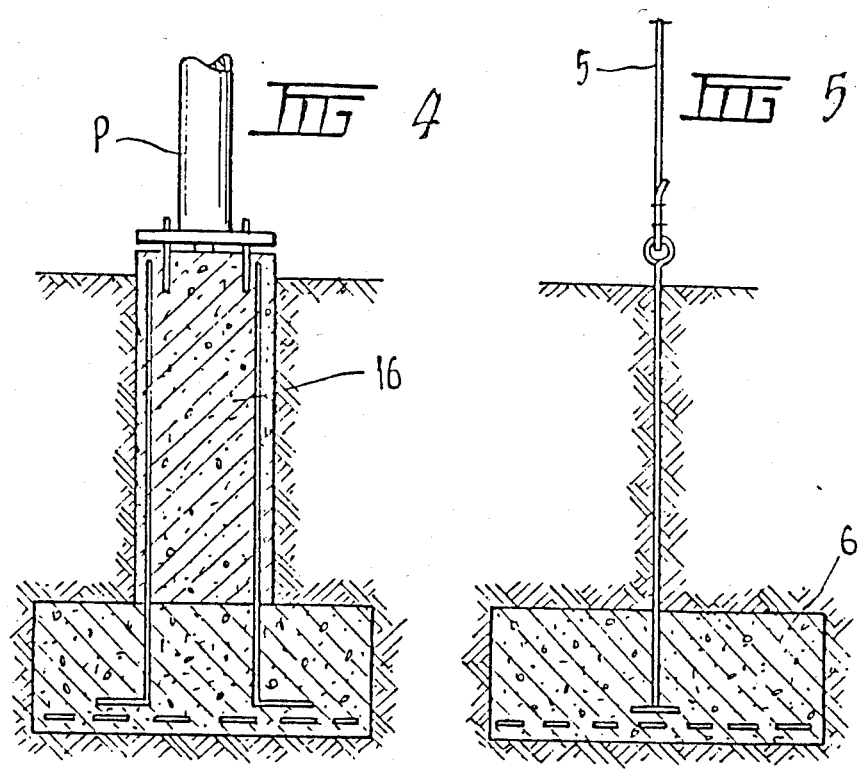

CANOPY

BACKGROUND OF THE INVENTION

1. Field of the Invention

This invention relates to a canopy and has been devised particularly though not solely as a shade canopy.

2. Description of the Related Art

It is necessary in many applications to provide an overhead canopy for shelter or shade and particularly in agricultural situations to provide shade for plants. Many other applications also require the provision of overhead canopies to protect or shade articles which are placed outside to prevent degradation from ultraviolet light. In the past shade canopies have been provided using various types of structures to support either opaque awnings or shade cloths using a rigid frame structure or a large number of upright poles or posts to support the cloth. It is a disadvantage of such systems that the poles or posts must be closely spaced in order to prevent excessive sagging of the canopy fabric which is difficult from the point of view of cultivation or the placing of large objects beneath the canopy.

SUMMARY OF THE INVENTION

It is therefore an object of the invention to provide a canopy which will obviate or minimize the foregoing disadvantages in a simple yet effective manner or which will at least provide the public with a useful choice.

Accordingly in one aspect the invention consists in a method of erecting a canopy comprising the steps of erecting a plurality of posts in a predetermined array, providing a plurality of panels of canopy fabric of stretch material having inelastic or low stretch tendons fastened thereto at or adjacent the panel edges, fastening diagonally opposite corners of each said panel to selected ones of said posts and drawing together the remaining corners of adjacent panels so as to tension said tendons and hence tension said stretch fabric.

Preferably said tendons are fastened to said fabric continuously along the length of each tendon.

Preferably said panel edges are substantially straight and the tendons are fastened thereto in a curve having each end thereof at adjacent corners of the panel and extending inwardly into the panel at the mid-portion of the panel edge.

Preferably said curve is a bell shaped curve being convex with respect to the panel edge adjacent the corners of the panel and concave with respect to the panel edge adjacent the mid portion of the panel edge.

Preferably said panels are rectangular and said posts are arranged in a rectangular array.

Preferably five said posts are provided in said rectangular array, therebeing one said post at each corner and one post in the middle, and wherein four said panels are provided, each panel being fastened first to the centre post and one corner post and then having the other two diagonally opposite corners drawn together with the adjacent corners of the adjacent panels at the mid-points of the sides of the rectangular array.

Preferably said fabric comprises a stretch knit fabric and said tendons comprise rope or webbing.

Preferably said fabric comprises knitted shade cloth and said tendons comprise webbing of the type commonly used for automotive seat belts.

Preferably said webbing is sewn to said fabric along the entire length of the webbing.

In a further aspect the invention consists in a canopy comprising an array of posts and a plurality of panels stretched therebetween at the desired height, each said panel being formed from stretch fabric material having inelastic or low stretch tendons fastened thereto at or adjacent the panel edges in a curve extending inwardly between the panel corners so that when the tendons are tensioned between the posts the curved tendons at least partially straighten drawing fabric from the middle area of the panel and tensioning the panel.

Preferably said curve is a bell shaped curve being convex with respect to the panel edge adjacent the corners of the panel and concave with respect to the panel edge adjacent the mid-portion of the panel edge.

Preferably said fabric comprises a stretch knit fabric and said tendons comprise rope or webbing.

Preferably said fabric comprises knitted shade cloth and said tendons comprise webbing of the type commonly used for automotive seat belts.

Preferably said webbing is sewn to said fabric along the entire length of the webbing.

In a still further aspect the invention consists in a rectangular canopy panel of stretch fabric having inelastic or low stretch tendons fastened thereto at or adjacent the panel edges in a curve extending inwardly between the panel corners.

Preferably said curve is a bell shaped curve being convex with respect to the panel edge adjacent the corners of the panel and concave with respect to the panel edge adjacent the mid-portion of the panel edge.

Preferably said fabric comprises a stretch knit fabric and said tendons comprise rope or webbing.

Preferably said fabric comprises knitted shade cloth and said tendons comprise webbing of the type commonly used for automotive seat belts.

Preferably said webbing is sewn to said fabric along the entire length of the webbing.

BRIEF DESCRIPTION OF THE DRAWINGS

Notwithstanding any other forms that may fall within its scope one preferred form of the invention will now be described by way of example only with reference to the accompanying drawings in which:

FIG. 1 is a plan view of a fabric panel used in a canopy according to the invention, FIG. 4 is a cross-sectional elevation to an enlarged scale of the footing for a post used in the canopy according to the invention, and FIG. 5 is a cross-sectional elevation to an enlarged scale of the footing for a tie-down used in the canopy according to the invention.

DETAILED DESCRIPTION OF THE PREFERRED EMBODIMENT

Figure 2:
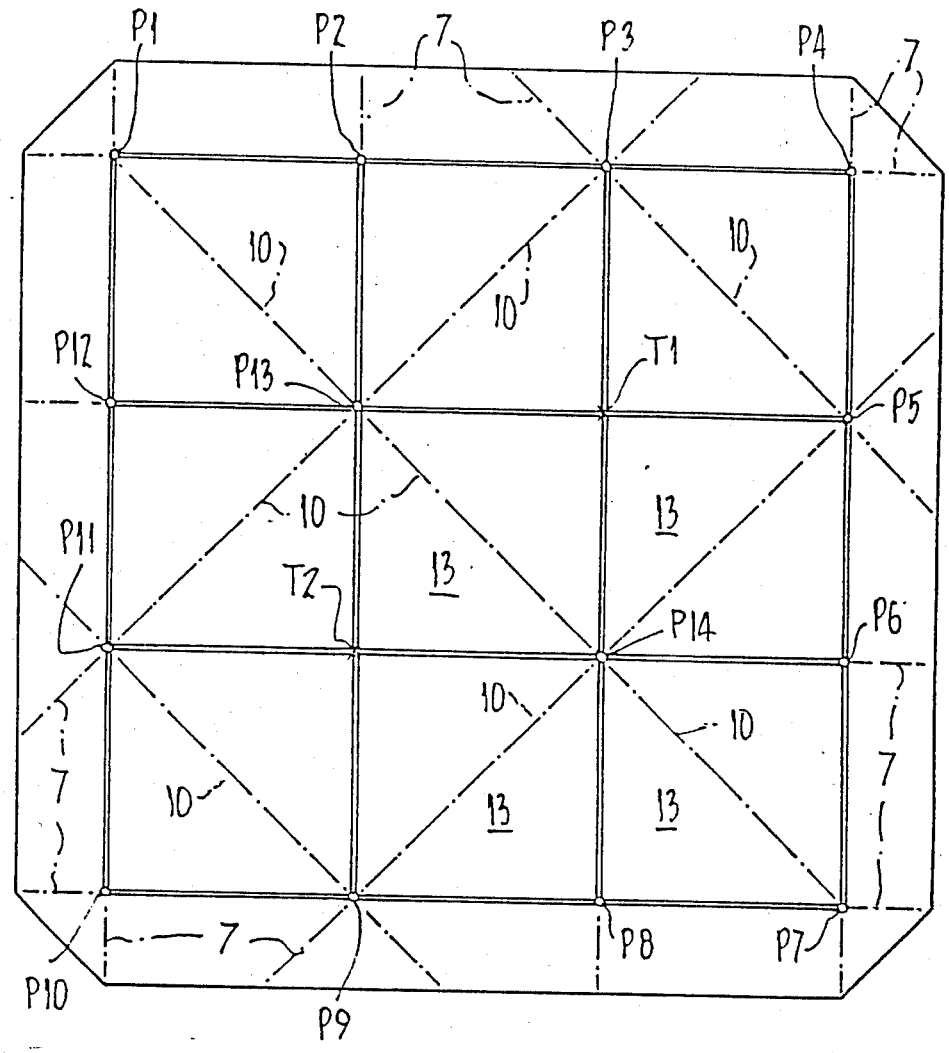
FIG. 2 is a plan view of a canopy according to the invention.
Figure 3:
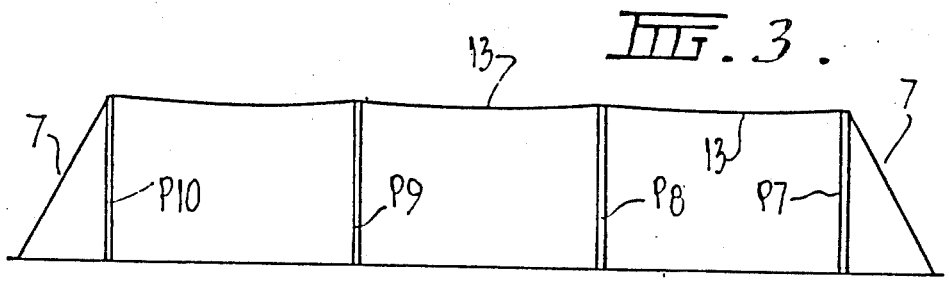
FIG. 3 is a side elevation of the canopy shown in FIG. 2.

In the preferred form of the invention a canopy particularly used as a shade canopy and using a fabric shade cloth is constructed as follows although it will be appreciated that the invention may be utilized in any situation where it is desired to provide an overhead canopy.

The canopy is formed from a plurality of panels such as that shown at 1 in FIG. 1 which may be formed from any desired stretch material and which in the preferred form of the invention are formed from knitted polyethylene shade cloth. A typical cloth is that made by Gale Pty. Ltd. of Australia as Elderado Weathershade. The panel may be of any desired size and may be formed from a single length of knitted cloth or from a number of lengths of cloth sewn together to form a large rectangular array. In the example of the invention shown in the accompanying drawings each panel may for example be approximately 50 feet (14.33 m) along each side. Each panel is provided with inelastic tendons fastened to the panel at or adjacent the panel edges. The inelastic characteristic of the tendons refers to a tendon exhibiting little or no stretching qualities. In the preferred form of the invention the tendons are formed from webbing 2 sewn to the panel fabric adjacent each edge. The tendons are formed from a type of webbing commonly used for automotive seat belts although it will be appreciated that other forms of webbing, rope or cable may be used in this application. The webbing is sewn continuously to the panel fabric in a curve extending inwardly between the panel corners 3 so that when the webbing is tensioned (as will be described below) the curve at least partially straightens drawing the fabric from the middle area 4 of the panel.

Although the curve may be a simple curve which is concave when viewed from the panel edge it has been found that a curve of this type over tensions the fabric in the areas adjacent the corners 3. It is therefore preferred to sew the webbing to the fabric in a bell shaped curve being convex with respect to the panel edge over the areas 2A adjacent the corners of the panel and concave with respect to the panel edge over the area 2B adjacent the mid-portion of the panel edge. The depth of the curve may be varied to suit the fabric used and the panel size but it has been found suitable with knitted polyethylene shade cloth in panels 14.3 m along each side to use a curve depth of 500 mm between the panel edge and the webbing at the mid-point of the side.

In one form of the invention the canopy may be erected using fourteen posts comprising twelve edge posts P1–P12 and two centre posts P13 and P14 as shown in FIG. 2. The canopy may however be formed to any required size or configuration using a basic rectangular array of four panels 13 based on four corner posts P13, P5, P9 and P7 and a centre post P14. It will be appreciated that the basic rectangular array may be repeated any number of times to build up a shade canopy to cover the desired area.

Each edge post is supported by guy wires 7 which are anchored into the ground by any convenient anchor such as a block of concrete buried in the ground. The posts may similarly be supported on any suitable footing such as that shown in FIG. 4. It is desirable that the posts can rock on the footing 16 to give an elastic structure which can move to absorb wind loadings or other abnormal loadings in use. The posts are further located by diagonal guy wires 10 which also serve to locate the centre posts P13 and P14.

Once the rectangular array of posts has been erected, fabric panels such as that shown in FIG. 1 are positioned within the array and opposite diagonal corners of the panels are secured to the posts at the desired height which is normally at the top of the posts. In this manner the diagonally opposite corners of the panels are fastened to their adjacent posts P1, P3, P13, P5, P11, P14, P9 and P7. The remaining diagonally opposite corners of the panels are then drawn together with the adjacent corners of the adjacent panels at points P2, P4, P12, T1, T2, P6, P10 and P8. Where these points coincide with a post, i.e., around the perimeter of the canopy, they may then be fastened to that post. At the intermediate points T1 and T2 it is not necessary to provide a post but desirable to provide tie-down wires 5 (FIG. 5) from the tension point to an anchor block 6 buried in the ground. The tie-down wires 5 serve to restrain the canopy in windy situations and prevent upward bowing or ballooning.

The drawing together and tensioning operation may be performed by any suitable tensioning apparatus. As the corners are drawn together to corner points the webbing tendons 2 are tensioned causing the curve of the webbing to straighten and tension the fabric across the entire area of the panels.

Once the panels have been drawn together and tensioned the edges of adjacent panels (outside the tendons) may be fastened together to form a continuous cover. The fastening may be by way of clips or lacing but preferably by sewing using a small hand held portable sewing machine.

The basic rectangular array of four panels 13 erected as described may be repeated to cover any desired area. It has been found that by using four such basic rectangular arrays of four panels each, it is possible to cover an area of approximately one acre. The area so covered has the advantage that there are only five internal posts within the acre area leaving large free areas for cultivation or storage. The canopy formed according to the invention is very resilient and capable of withstanding high wind loadings and furthermore because it is an elastic tensioned structure the canopy is able to resist impact from various objects such as falling branches without significant damage to the canopy.

In this manner a canopy can be provided which is simple and easy to erect and which can cover large areas of land in a simple and cheap manner with the use of a minimum number of support posts.

Although the canopy has been described in a certain size and using a certain material it will be appreciated that the basic canopy system may be applied in many different applications requiring different canopy sizes and using different fabric to suit the intended application.

We claim:

1. A canopy comprising an array of posts and a plurality of panels stretched therebetween at a desired height;
   each of said panels comprising;
   a stretch fabric panel member; and a means for tensioning said panel extending inwardly along edges of said panel member between adjacent corners in a bell shaped configuration, which is concave in a center portion and convex in areas adjoining said corners, relative to said edge, wherein
   said means for tensioning is an inelastic tendon fastened to said panel member; and
   wherein each of said tendons is tensioned between said posts so that the configuration is at least partially straightened thereby drawing the fabric from a middle area of the panel and tensioning said panel.

2. A canopy panel as claimed in claim 18, wherein said fabric comprises a stretch knit fabric and said tendon is webbing.

3. A canopy panel as claimed in claim 2 wherein said fabric comprises knitted shade cloth and said tendons comprise webbing of the type commonly used for automobile seat belts.

4. A canopy panel as claimed in claim 3 wherein said tendons comprise webbing which is sewn to said fabric along the entire length of the webbing.

5. A canopy as claimed in claim 1 wherein said fabric comprises a stretch knit fabric and said tendons comprise webbing.

6. A canopy panel as claimed in claim 1, wherein said fabric comprises knitted shade cloth and said tendons comprise webbing of the type commonly used for automobile seat belts.

7. A canopy according to claim 1, wherein said panels are rectangular and said posts are arranged in a rectangular array.

8. A canopy according to claim 7, wherein said array comprises four rectangularly arranged posts and one post arranged centrally to said four posts; and further comprising four panels each arranged with a first corner attached to said one post and a second diagonally opposed corner attached to a respective one of said four posts and wherein each remaining corner is attached to a remaining corresponding corner of an adjacent panel.

9. A canopy according to claim 8, further comprising means for attaching adjacent edges of said panels.

10. A canopy according to claim 9, further comprising means for tying down attached remaining corners.

11. A canopy panel comprising:
a stretch fabric panel member; and
means for tensioning said panel extending inwardly along edges of said panel member between adjacent corners in a bell shaped configuration which is concave in a center portion and convex in areas adjoining said corners, relative to said edge, wherein said means for tensioning is an inelastic tendon fastened to said panel member.

12. A canopy panel according to claim 3, wherein said tendons are fastened to said fabric along an entire length of said tendon.

13. A canopy panel according to claim 11, wherein said edges are substantially straight.

* * * * *